United States Patent
Lacasse et al.

(10) Patent No.: US 6,942,796 B2
(45) Date of Patent: Sep. 13, 2005

(54) FILTER DEVICE FOR FILTERING A LIQUID

(75) Inventors: Roger Lacasse, Notre-Dame du Portage (CA); Pierre Talbot, Notre-Dame du Portage (CA); Henri Ouellet, Rivière-du-Loup (CA); Bernard Juneau, Ste-Foy (CA)

(73) Assignee: Premier Tech (CA)

( * ) Notice: Subject to any disclaimer, the term of this patent is extended or adjusted under 35 U.S.C. 154(b) by 0 days.

(21) Appl. No.: 09/815,857

(22) Filed: Mar. 23, 2001

(65) Prior Publication Data

US 2001/0023845 A1 Sep. 27, 2001

(30) Foreign Application Priority Data

Mar. 23, 2000 (CA) .............................. 2301992

(51) Int. Cl.⁷ ..................... B01D 29/44; B01D 21/00; B01D 29/15
(52) U.S. Cl. ................ 210/316; 210/336; 210/338; 210/345; 210/489; 210/497.01; 210/497.3; 210/521; 210/532.2
(58) Field of Search ............................ 210/532.2, 483, 210/488–489, 323.2, 335–338, 521, 522, 497.3, 497.01, 330, 331, 345–346, 314–315, 316, 486

(56) References Cited

U.S. PATENT DOCUMENTS

| | | | |
|---|---|---|---|
| 653,012 A * | 7/1900 | Koyl ........................... 210/305 |
| 2,670,851 A * | 3/1954 | Curtis ......................... 210/435 |
| 2,750,045 A * | 6/1956 | Hoffmann et al. ........... 210/338 |
| 2,900,084 A | 8/1959 | Zabel ........................... 210/460 |
| 3,332,552 A | 7/1967 | Zabel ........................... 210/86 |
| 3,515,280 A * | 6/1970 | Parker ......................... 210/314 |
| 3,951,818 A | 4/1976 | Bosnjak ....................... 210/522 |
| 4,402,829 A * | 9/1983 | Cordua .................... 210/333.01 |
| 4,405,459 A | 9/1983 | Smith .......................... 210/521 |
| 4,439,323 A | 3/1984 | Ball ............................. 210/608 |
| 4,448,689 A * | 5/1984 | von Nordenskjold ....... 210/521 |
| 4,707,259 A * | 11/1987 | Doucet ........................ 210/351 |
| 4,710,295 A | 12/1987 | Zabel ........................... 210/336 |
| 5,382,357 A | 1/1995 | Nurse .......................... 210/170 |
| 5,482,621 A | 1/1996 | Nurse .......................... 210/170 |
| 5,492,635 A | 2/1996 | Ball ............................. 210/802 |
| 5,580,453 A | 12/1996 | Nurse, Jr. ................. 210/323.2 |
| 5,582,716 A | 12/1996 | Nurse, Jr. .................... 210/121 |
| 5,593,584 A | 1/1997 | Nurse, Jr. .................... 210/346 |
| 5,683,577 A | 11/1997 | Nurse, Jr. .................... 210/170 |
| 6,306,299 B1 * | 10/2001 | Nurse et al. ................. 210/256 |
| 6,360,898 B1 * | 3/2002 | Nurse et al. ................. 210/314 |

FOREIGN PATENT DOCUMENTS

| | | |
|---|---|---|
| CA | 2135937 | 10/1996 |
| DE | 23 48 845 | 4/1975 |
| EP | 0 233 953 | 9/1987 |
| EP | 528067 A1 * | 2/1993 |
| GB | 1396151 | 6/1975 |
| NL | 30 162 | 6/1933 |

* cited by examiner

Primary Examiner—Terry K. Cecil
(74) Attorney, Agent, or Firm—St. Onge Steward Johnston & Reens LLC

(57) ABSTRACT

A filter unit is disclosed suitable for use in a filter housing. The filter unit comprises superposed and spaced-apart inclined lamellar structures, preferably in the form of hollow truncated cones, each having a lower end side opposite an upper end side and a passage for a flow of liquid between each two of the lamellar structures. Each passage has an inlet for receiving an inflow of liquid to be filtered and an outlet for discharging an outflow of filtered liquid. In each of the passages, an overflow dam wall following a sinuous path is obstructing the flow of liquid and retains particulate matter contained in the liquid. The filter unit is mounted vertically in a filter housing. The invention also concerns a prefilter comprising a filter unit as described above mounted vertically in a filter housing. Such prefilter can advantageously be used at the outlet of a septic tank

15 Claims, 8 Drawing Sheets

FILTER DEVICE FOR FILTERING A LIQUID

FIELD OF THE INVENTION

The present invention relates in general to the field of filter devices for filtering liquids containing particulate matters, more specifically waste water. More particularly, it concerns a filter unit for use in a filter housing adapted to be mounted at the outlet of a septic tank. It also concerns a combination of a filter unit with a filter housing suitable for use in a septic tank, such combination being hereinafter called a prefilter.

BACKGROUND OF THE INVENTION

The development of prefilters to favour the retention of solid matters inside septic tanks goes back about 40 years (U.S. Pat. No. 2,900,084). Such prefilters have spread during the last 20 years, and more particularly during the last 10 years. As an illustration, many American states legally require the installation of prefilters at the outlet of the tanks, in order to limit the charge of particulate matters to be treated at the purifying element following the septic tank.

Already known in the prior art, there are prefilters composed of one or many hollow vertical elements of various forms perforated with openings or slits and enclosed in a housing having an inlet for receiving the waste water and an outlet connected to the outlet of the septic tank in order to allow the evacuation of the filtered water. Examples of such prior art prefilters are given in U.S. Pat. No. 4,439,323; U.S. Pat. No. 5,492,635; U.S. Pat. No. 5,580,453; U.S. Pat. No. 5,382,357 and U.S. Pat. No. 5,482,621. Usually, these prefilters do not provide decantation and/or coalescence phenomenon of the finer particles. The retention is thus assured essentially by the chosen size of the openings whether they be orifices or slits. The feed of these vertical filtering structures can be done from the interior of the element towards the exterior or from the exterior towards the interior, depending on the selected hydraulic flow model. The recourse to such hollow vertical structures favours a partial detachment of the biomass but requires either a filtering element of large dimension, as disclosed in U.S. Pat. No. 4,439,323 or the multiplication of the number of filtering elements, as disclosed in U.S. Pat. No. 5,492,635, and U.S. Pat. No. 5,580,453. If this is not the case, the total available filtration area requires more than one cleaning per year for residences producing a discharge corresponding to an occupation of more than four people.

Also known in the prior art, there are the prefilters of the type disclosed in U.S. Pat. No. 4,710,295 which include a plurality of stacked horizontally extending disc-dam units mounted in vertical in a housing. Each disc is equipped with finger shaped appendices or diverticulums formed by a continuous dam wall that follows a sinuous path and whose top side is open. The superposition and the alignment of the discs by ensuring a spacing between them, helps create a first filtration linear interstice and the sinuous dam-wall creates a second filtration interstice. Therefore, for a given volume, it is possible to increase the available interstitial surface in comparison with the one corresponding to the sum of the set of slits or perforated orifices in a hollow vertical element as described above. In such prefilters, the water to be filtered enters the housing and flows upwardly in vertical channels and then in the horizontal channels formed between each disc where it is filtered. Thus, the control of the particles to be retained is done first at the first filtration interstice. The water then flows horizontally and is further filtered by the dam wall. Usually, the larger particles are retained on the outside of the disc-dam unit and the finer particles have the possibility of decanting in the zone between two horizontal discs leading to the outlet zone.

One drawback encountered with such prefilters is that with time, the accumulation of fine particles and the formation of a biological film between the horizontal discs creates hydraulic restrictions that favour a detachment of the accumulated matters towards the effluent of the septic tank and ultimately requires a cleaning. Cleaning a structure of this type is tedious and may require a complete dismantling of the different elements.

Furthermore, although such prefilters offer a better efficiency than what was known previously, one goal in this field is still to uncover or develop a prefilter being the least voluminous possible and which can offer the maximum filtration capacity.

Therefore, there is still a need at the present time for a filter with a higher efficiency than the existing filters.

Other examples of prior art filter apparatuses for waste water are given in: CA 2,135,937; U.S. Pat. No. 3,332,552; U.S. Pat. No. 5,582,716; U.S. Pat. No. 5,593,584; and U.S. Pat. No. 5,683,577.

SUMMARY OF THE INVENTION

An object of the present invention is to propose a filter unit that satisfies the above-mentioned need.

According to the present invention, that object is achieved with a filter unit suitable for use in a filter housing. The filter unit comprises superposed and spaced-apart inclined lamellar structures each having a lower end side opposite an upper end side; and a passage for a flow of liquid between each two of the lamellar structures. Each passage has an inlet for receiving an inflow of liquid to be filtered and an outlet for discharging an outflow of filtered liquid. The filter unit further comprises filtering means in each of the passages for obstructing the flow of liquid and retaining particulate matter contained in the liquid. Mounting means for mounting the filter unit vertically in the filter housing are also provided.

Advantageously, the inclined configuration of the lamellar structure allows an increase of the filtration capacity of the filter unit in comparison to a filter unit composed of flat structures, such as described in the American U.S. Pat. Nos. 2,900,084; 3,332,552; 4,710,295; 5,582,716; and 5,593,584.

The present invention is also directed to a combination of a filter unit as described above with a filter housing, such combination being hereinafter referred to as a prefilter. The filter housing of the prefilter has an inlet in a bottom portion thereof for receiving an inflow of liquid to be filtered and an outlet in a top portion thereof for discharging an outflow of filtered liquid. The filter unit is mounted vertically in the filter housing by means of the mounting means. The prefilter further comprises:

a reception chamber in the filter housing in fluid communication with the inlet of the housing and with the inlets of the filter unit, the liquid to be filtered entering the housing via the inlet thereof and flowing across the reception chamber to enter the inlets of the filter unit; and a discharge chamber in the filter housing in fluid communication with the outlets of the filter unit and the outlet of the filter housing, the filtered liquid discharged at the outlets of the filter unit flowing across the discharge chamber towards the outlet of the filter housing.

According to a preferred feature of the invention, all the lamellar structures are similar and have the shape of hollow truncated cones. Advantageously, this configuration of the lamellar structures, among other things, makes it easier to stack the same on top of each other.

Also preferably, the inlet of each of the passages is located on the lower end side of the respective lamellar structures and the outlet is located on the upper end side of the respective lamellar structures, whereby the flow of liquid in the passages is ascendant and the particulate matters retained by the filtering means, which is preferably an overflow dam wall, accumulate on the lower side of the lamellar structures. Thus, such preferred configuration allows the particulate matter accumulated behind the filtering means of each lamellar structure to detach from the lamellar structure and to fall down by gravity into the reception chamber.

According to a preferred embodiment of the invention, each of the lamellar structures in the form of hollow truncated cones has an outer peripheral edge and an inner edge smaller than the outer peripheral edge, the outer peripheral edge being the upper end side of the lamellar structure and the inner edge being the lower end side of the lamellar structure, whereby the reception chamber of the prefilter is located in a central zone of the filter unit and the discharge chamber is located all around the same.

According to a further preferred embodiment of the invention, each of the lamellar structures in the form of hollow truncated cones has an outer peripheral edge and an inner edge smaller than the outer peripheral edge, the outer peripheral edge being the lower end side of the lamellar structure and the inner edge being the upper end side of the lamellar structure, whereby the reception chamber of the prefilter is located all around the filter unit and the discharge chamber is located in a central zone of the same.

According to the present invention, the above-mentioned object is also achieved with a prefilter comprising:
- a filter housing having an inlet in a bottom portion thereof for receiving an inflow of liquid to be filtered and an outlet in a top portion thereof for discharging an outflow of filtered liquid;
- a lower filter unit located in the bottom portion of the housing, comprising:
  - superposed and spaced-apart inclined lamellar structures having the shape of hollow truncated structures each having a lower end side opposite an upper end side;
  - a passage for a flow of liquid between each two of said lamellar structures, each passage having an inlet for receiving an inflow of liquid to be filtered and an outlet for discharging an outflow of filtered liquid;
  - filtering means in each of said passages for obstructing the flow of liquid and retaining particulate matter contained in the liquid; and
  - a discharge chamber in fluid communication with the outlets of the lower filter unit, the discharge chamber being located in a centrally located zone of the lower filter unit;
- a reception chamber in the filter housing in fluid communication with the inlet of the housing and with the inlets of the lower filter unit, the liquid to be filtered entering the housing via the inlet thereof and flowing across the reception chamber to enter the inlets of the lower filter unit; and the filtered liquid discharged at the outlets of the lower filter unit flowing across the discharge chamber towards the outlet of the filter housing;
- an upper filter unit located in the top portion of the housing on top of the lower filter unit for further filtering liquid previously filtered in the lower filter unit, the upper filter unit comprising:
  - superposed and spaced-apart truncated hollow structures similar in shape and size with the truncated structures of the lower filter unit and being in registry with the same, the upper filter unit having a lowermost truncated structure superposed on an uppermost truncated structure of the lower filter unit, the hollow truncated structures of the upper filter unit having an upper end side and a lower end side, and a centrally located zone on top of the centrally located zone of the lower filter unit;
  - a passage for a flow of liquid between each two of said spaced-apart truncated structures having an inlet for receiving an inflow of liquid to be filtered and an outlet for discharging an outflow of filtered liquid; and
  - filtering means in each of said passages for obstructing the flow of liquid and retaining particulate matter contained in the liquid;
  - a reception chamber located in the centrally located zone thereof, the reception chamber being in fluid communication with the discharge chamber of the lower filter unit and with the inlet of each of the passages of the upper filter unit;
- a discharge chamber for the upper filter unit located in the top portion of the filter housing around said upper filter unit, the discharge chamber being in fluid communication with the outlet of each of the passages of the upper filter unit and with the outlet of the housing;
- means for hermetically separating the reception chamber of the lower filter unit and the discharge chamber of the upper filter unit; and
- mounting means for mounting the filter units vertically in the filter housing.

Preferably, in order to better control the flow of liquids entering the filter housing, any of the preferred embodiments of the invention may further comprise an inlet chamber extending at the bottom end of the filter housing. Such inlet chamber is in fluid communication with the reception chamber of the filter housing via an outlet of the inlet chamber hermetically connected to the inlet of the filter housing. The inlet chamber further has a sidewall provided with a plurality of slots sized and shaped for receiving and prefiltering a liquid to be filtered, whereby the liquid to be filtered enters the inlet chamber via the slots thereof and then flows across the inlet chamber and upwardly in the reception chamber of the filter housing.

In accordance with a further aspect, the present invention provides a prefilter comprising:
- a filter housing having an inlet in a bottom portion thereof for receiving an inflow of liquid to be filtered and an outlet in a top portion thereof for discharging an oufflow of filtered liquid;
- a filter unit mounted vertically in the filter housing, comprising:
  - superposed and spaced-apart inclined lamellar structures having the shape of hollow truncated structures, each having a lower end side opposite an upper end side;
  - a passage for a flow of liquid between each two of said lamellar structures, each passage having an inlet for receiving an inflow of liquid to be filtered and an outlet for discharging an outflow of filtered liquid;
  - filtering means in each of said passages for obstructing the flow of liquid and retaining particulate matter contained in the liquid a reception chamber in the filter housing in fluid communication with the inlet of the housing and with the inlets of the filter unit, the liquid to be filtered entering the housing via the inlet thereof and flowing across the reception chamber to enter the inlets of the filter unit;

a discharge chamber in the filter housing in fluid communication with the outlets of the filter unit and the outlet of the filter housing, the filtered liquid discharged at the outlets of the filter unit flowing across the discharge chamber towards the outlet of the filter housing;

wherein the filter housing has a top end and a bottom end, the inlet of the filter housing being an opening in the bottom end thereof, and the prefilter further comprising:

an inlet chamber extending at said bottom end of the filter housing, the inlet chamber being in fluid communication with the reception chamber of the filter housing via an outlet of the inlet chamber hermetically connected to the inlet of the filter housing, the inlet chamber having a sidewall provided with a plurality of slots sized and shaped for receiving and prefiltering liquid to be filtered, whereby the liquid to be filtered enters the inlet chamber via the slots thereof and then flows across the inlet chamber and upwardly in the reception chamber of the filter housing; and mounting means for mounting the filter units vertically in the filter housing.

BRIEF DESCRIPTION OF THE DRAWINGS

These and other objects and advantages of the invention will become more apparent upon reading the detailed description and upon referring to the drawings in which.

Figure 1:
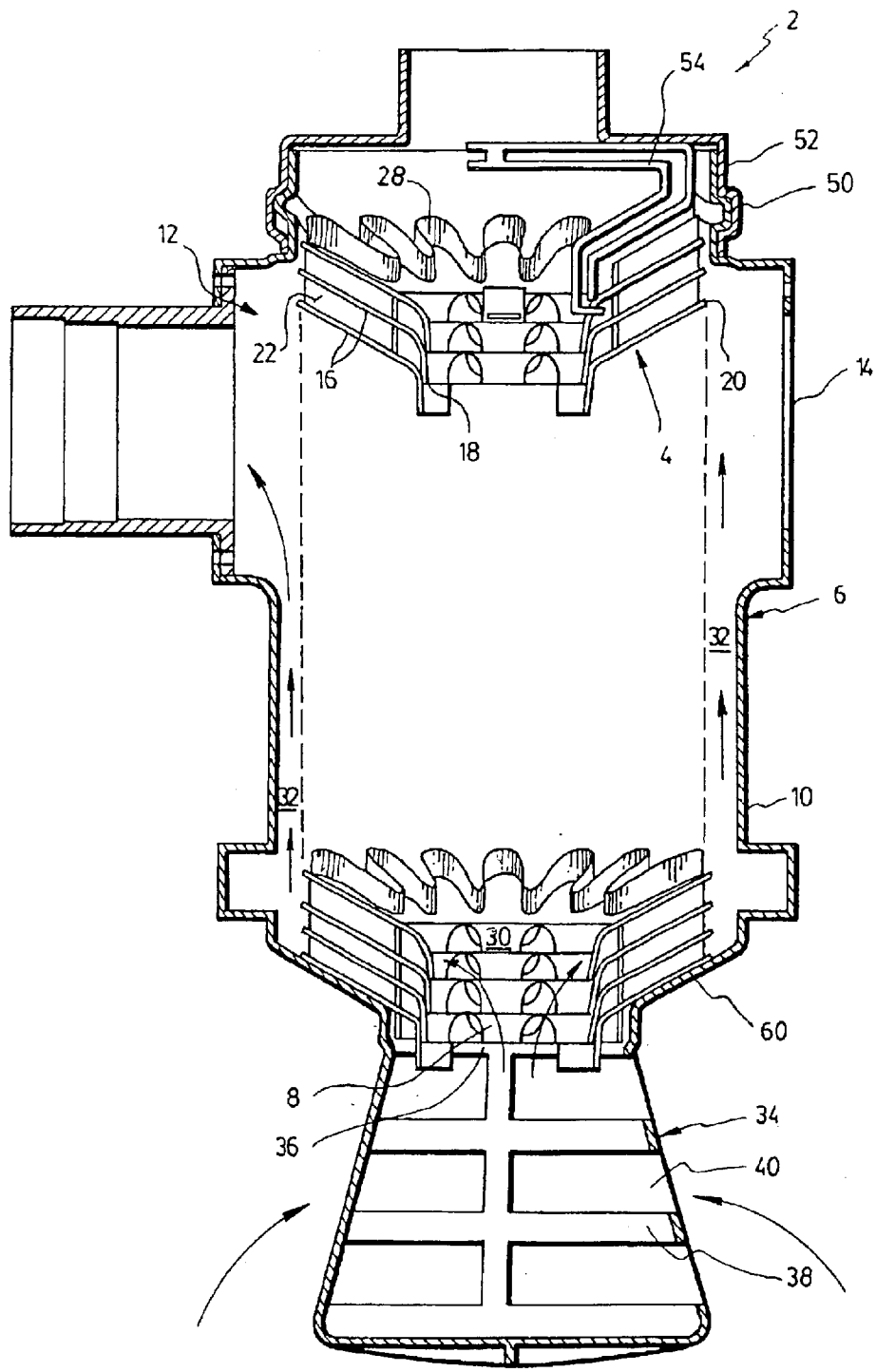
FIG. 1 is a cross-sectional side view of a prefilter according to a first preferred embodiment of the invention.

DETAILED LIST OF THE ELEMENTS WITH THE NUMERAL REFERENCES 2 prefilter
4 filter unit housing
6 filter housing
8 inlet of the filter housing
10 bottom portion of the filter
12 outlet of the filter housing
14 top portion of the filter housing
16 lamellar stuctures including hollow truncated cones
18 lower end side of the lamellar structures
20 upper end side of the lamellar structures
22 passage
24 inlet of the passage
26 outlet of the passage
28 overflow dam wall
29 top edge of the dam wall
30 reception chamber
32 discharge chamber
34 inlet structure
36 outlet of the inlet structure
38 sidewall of the inlet structure
40 slots of the inlet structure
42 linear filtration interstices
44 tab of the conical lamellar structure
46 tab receiving element
48 end of the tab
50 top end of the filter housing
52 cover of the housing
54 hanger for the filter unit
56 lower portion of the hanger
58 brackets of the hanger
60 bottom wall of the filter housing
62 extra outlet of the filter housing
64 outlet pipe
66 annular restriction
68 outlet chamber
70 watertight liner
72 inside rim
80 upper filter unit
82 centrally located zone
84 reception chamber of the upper filter unit
86 discharge chamber of the upper filter unit
88 vertical slots in the dam wall While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DESCRIPTION OF PREFERRED EMBODIMENTS

In the following description, similar features in the drawings have been given similar reference numerals and in order to lighten the figures, some elements are not referred to in some figures if they were already identified in a precedent figure.

Figure 5:
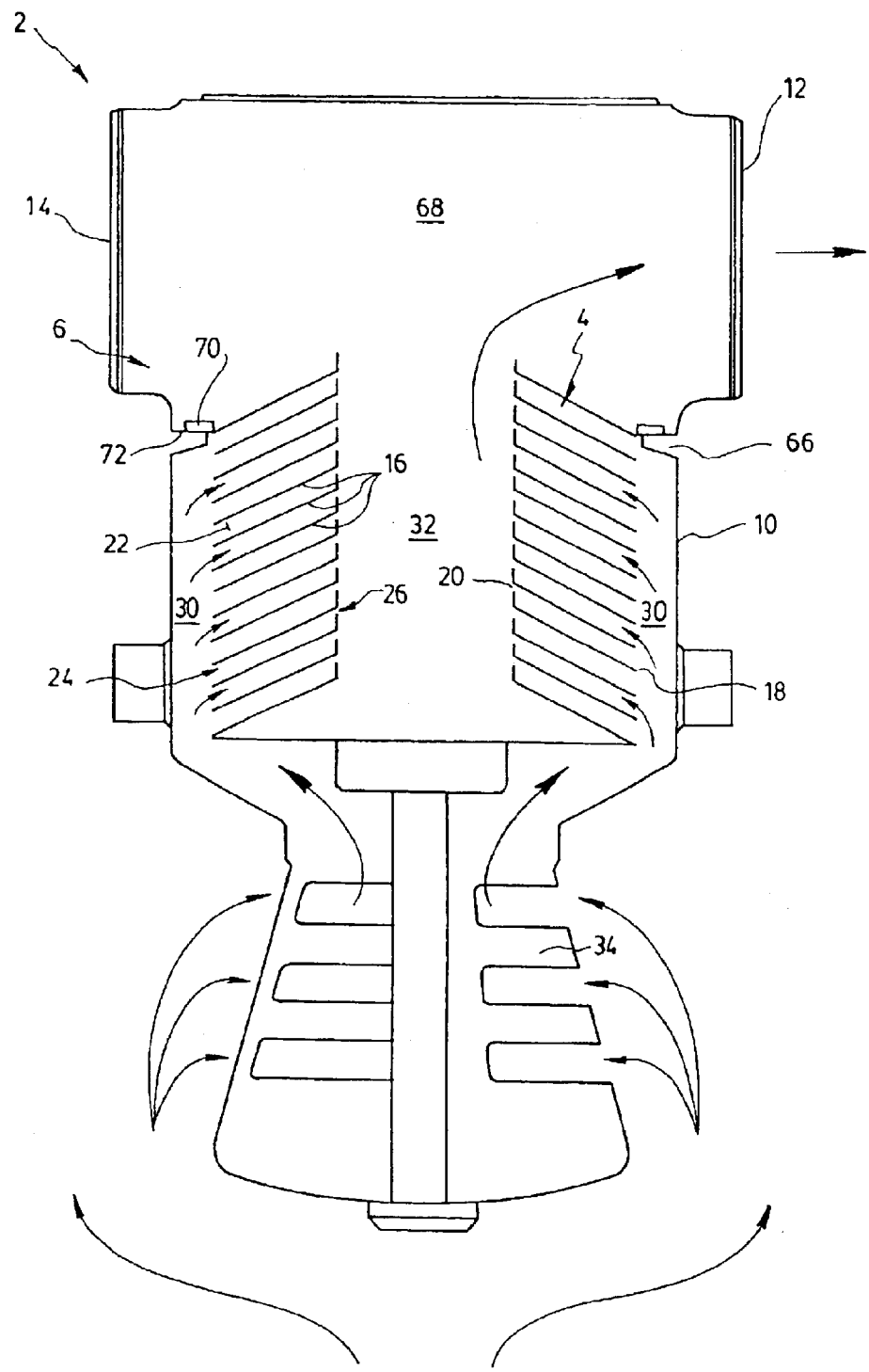
FIG. 5 is a schematic cross-sectional side view of a prefilter according to the second preferred embodiment of the invention showing the flow of liquids therein.
Figure 6:
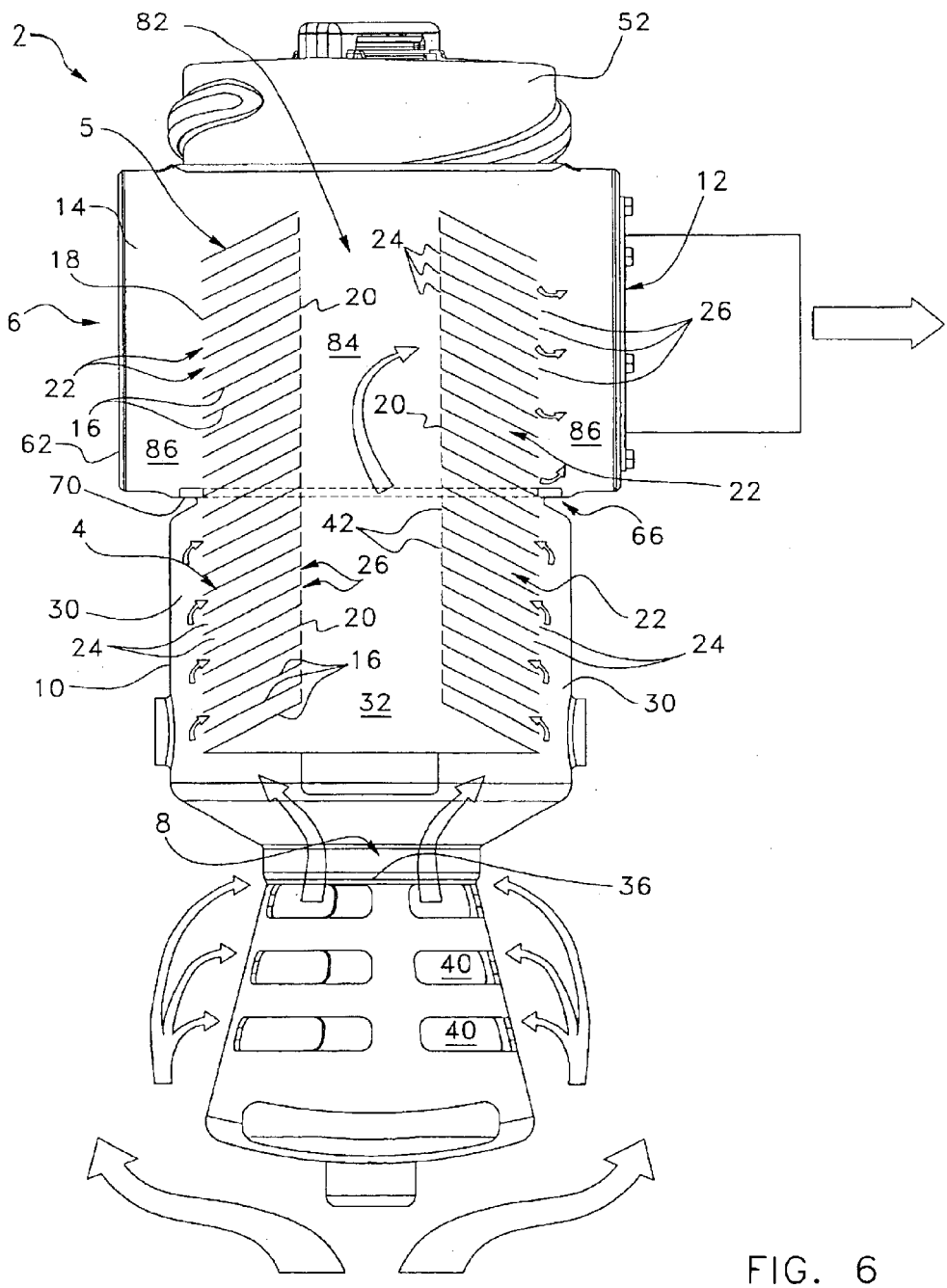
FIG. 6 is a schematic cross-sectional side view of the prefilter according to a third preferred embodiment, showing the flow of liquids therein.

Referring to FIGS. 1, 5 and 6 and broadly described, either one of the preferred embodiments of the invention concerns a prefilter (2) comprising a filter unit (4) mounted vertically in a filter housing (6).

The filter housing (6) has an inlet (8) in a bottom portion (10) thereof for receiving an inflow of liquid to be filtered and an outlet (12) in a top portion (14) thereof for discharging an outflow of filtered liquid.

The filter unit (4) for each of these preferred embodiments has the following common characteristics. It comprises superposed and spaced-apart inclined lamellar structures (16) each having a lower end side (18) opposite an upper end side (20). As can be appreciated, a passage (22) for a flow of liquid is defined between each two of the lamellar structures (16). Each passage (22) has an inlet (24) for receiving an inflow of liquid to be filtered and an outlet (26) for discharging an outflow of filtered liquid. The filter unit (4) further comprises filtering means in each of the passages

(22) for obstructing the flow of liquid and retaining particulate matter contained in the liquid. The filtering means is preferably an overflow dam wall (28), as best shown in either FIG. 2 or 8.

The prefilter (2) also comprises a reception chamber (30) in the filter housing (6) in fluid communication with the inlet (8) of the housing (6) and with the inlets (24) of the filter unit (4). The liquid to be filtered enters the housing (6) via the inlet (8) thereof and is flowing across the reception chamber (30) to enter the inlets of the filter unit (24).

The prefilter (2) further comprises a discharge chamber (32) in the filter housing (4) in fluid communication with the outlets (26) of the filter unit (4) and the outlet (12) of the filter housing (6). Therefore, the filtered liquid discharged at the outlets (26) of the filter unit (4) is flowing across the discharge chamber (32) towards the outlet (12) of the filter housing (6).

Such prefilters (2), although not limited to that specific use, may advantageously be used at the outlet of a septic tank in order to limit the charge of particulate matters to treat at the purifying element following the septic tank. A prefilter (2) according to the invention may also be suitable for use with any tank having an outlet for discharging a liquid containing particulate matters.

Figure 2:
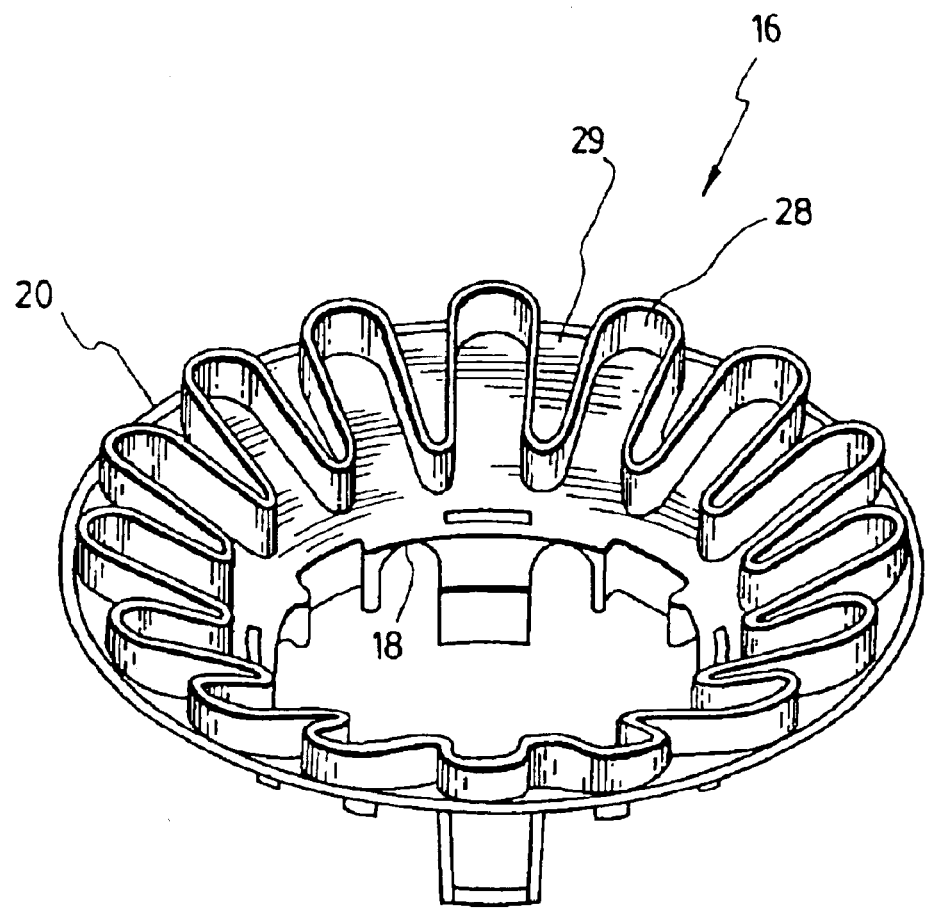
FIG. 2 is a perspective view of a lamellar structure in the form of a hollow truncated cone used to build the filter unit of the prefilter of FIG. 1.
Figure 8:
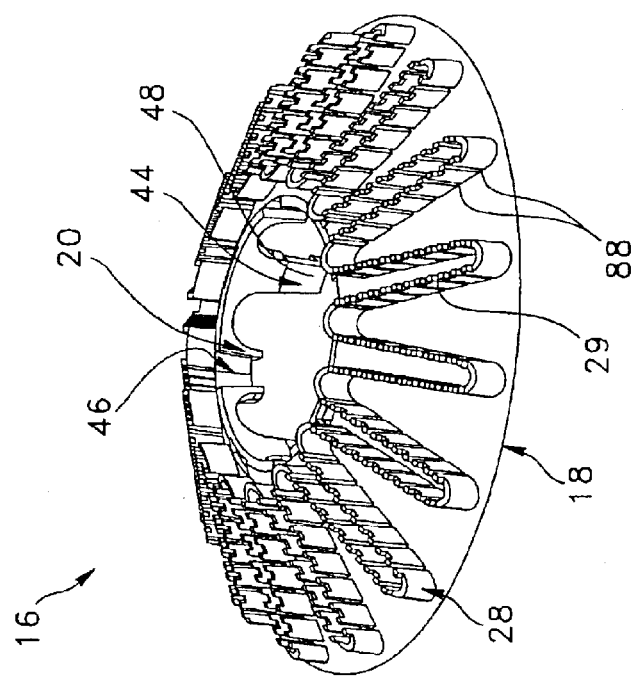
FIG. 8 is a perspective view of a lamellar structure in the form of a hollow truncated cone used to built the filter unit of the prefilter of FIG. 6.

According to a preferred feature of the invention, all the lamellar structures (16) are similar and have the shape of hollow truncated cones, as best shown in FIGS. 2 and 8. Advantageously, this configuration of the lamellar structures (16), among other things, makes it easier to stack the same on top of each other.

It is however worth noting that the lamellar structures (16) of the filter unit are not limited to that conical configuration. They could have the shape of inclined discs or any other shape as long as they have an inclined surface once superposed with other like lamellar structures.

Also preferably and as shown in FIGS. 1, 5 and the bottom portion of FIG. 6, the inlet (24) of each of the passages (22) is located on the lower end side (18) of the respective lamellar structures (16) and the outlet (26) is located on the upper end side (20) of the respective lamellar structures (16), whereby the flow of liquid in the passages (22) is ascendant and the particulate matters retained by the dam walls (28) accumulate on the lower side of the lamellar structures (16). Thus, such preferred configuration allows the particulate matters accumulated behind the dam walls (28) of each lamellar structure (16) to detach from the same and to fall down by gravity into the reception chamber (30). It also allows an easy cleaning of the structure with a jet of water.

The approach of the preferred embodiments of the invention shown in either one of FIG. 1, 5 or 6 is based on the following hydraulic and physical principles: the water enters the filter housing (6) preferably via an inlet structure (34) extending at the bottom end of the filter housing (6), which inlet structure (34) will be described hereinafter. After that, the water flows vertically in the reception chamber (30) which is either a cylindrical zone at the centre of the filter unit (4), as in the first preferred embodiment shown in FIG. 1, or a peripheral zone, as in the second and third preferred embodiments shown in FIGS. 5 and 6. Thus, in the first preferred embodiment, the water flows from the inside towards the outside of the filter unit (4), and in the second and third embodiments, the water flows from the outside towards the inside of the filter unit. The reception chamber (30) is formed by the superposition of the lamellar structures (16), preferably having the shape of a hollow truncated cone.

The stacked lamellar structures (16) form a series of channels or passages (22) inclined with respect to the horizontal where the water circulates following an ascending radial trajectory, from the centre towards the perimeter or from the perimeter towards the centre.

The inlet structure (34) extending at the bottom end of the filter housing (6) is in fluid communication with the reception chamber (30) of the filter housing (6) via an outlet (36) of the inlet chamber (34) hermetically connected to the inlet (8) of the filter housing (6). The inlet chamber (34) has a sidewall (38) provided with a plurality of slots (40) sized and shaped for receiving and prefiltering liquid to be filtered, whereby the liquid to be filtered enters the inlet chamber (34) via the slots (40) thereof and then flows across the inlet chamber (34) and upwardly in the reception chamber (30) of the filter housing (6). The inlet chamber (34), which preferably has a nozzle shape, limits the carry over of fine particles associated with gas bubbles and ensures a better control of the velocity of the liquids entering the filter housing (6). More specifically, it can ensure a velocity of liquids inferior to 0.6 cm/s in order to limit the carry over of the heavier solids.

The outlet (36) of the inlet structure (34) can be designed so as to be screwable to the inlet (8) of the filter housing (6) or it could also be integrally formed with the filter housing.

DETAILED DESCRIPTION OF EACH PREFERRED EMBODIMENT

Description of the First Preferred Embodiment

Figure 3:
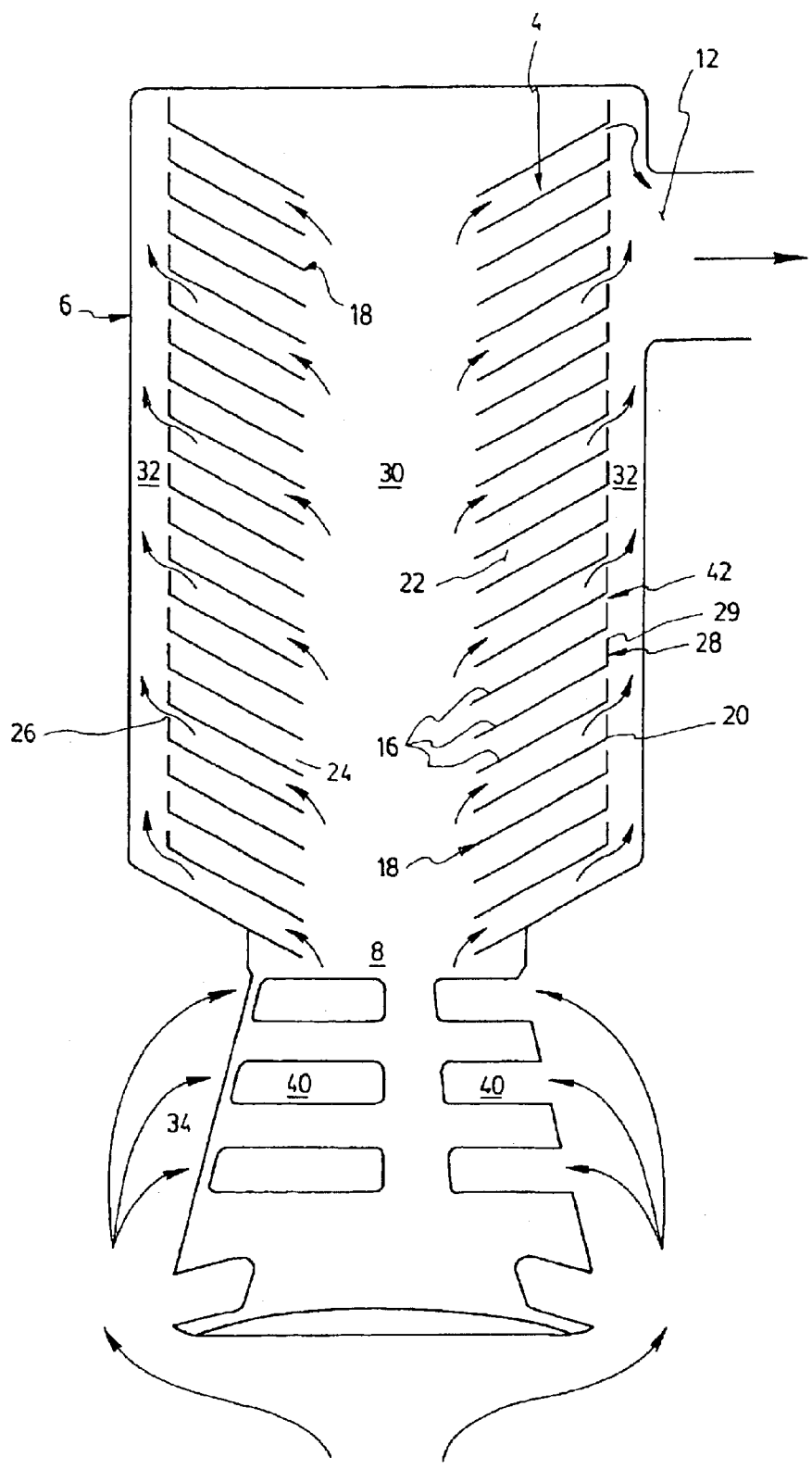
FIG. 3 is a schematic cross-sectional side view of the prefilter of FIG. 1 showing the flow of liquids therein.

Referring to FIGS. 1 to 3, in the first preferred embodiment of the invention, each of the lamellar structures (16) in the form of hollow truncated cones has an outer peripheral edge and an inner edge smaller than the outer peripheral edge. A single truncated cone (16) is shown in FIG. 2. The outer peripheral edge corresponds to the upper end side (20) of the lamellar structure (16) and the inner edge to the lower end side (18) of the lamellar structure (16), whereby the reception chamber (30) of the prefilter (2) is located in a central zone of the filter unit (4) and the discharge chamber (32) is located all around the same, as best shown in FIG. 3.

Turning now to FIG. 2, each of the truncated cones (16) has an overflow dam wall (28) extending upright from an upper surface thereof. The dam wall (28) has a top edge (29) and a height sized so that the top edge (29) is spaced apart from the underside surface of an upwardly adjacent cone (16) once stacked in a pile with like cone (16), as best shown in FIG. 3. A linear filtering interstice (42) is thus formed between the top edge (29) of the dam wall (28) and the underside surface of an upper lamellar structure (16). In order to increase the filtering capacity of the filter unit (4), the overflow dam wall (28) in each of the passages (22) has a sinuous path.

The filter unit (4) also comprises linking means for linking the conical lamellar structure (16) one to another in superposition. The linking means preferably comprises a plurality of tabs (44) extending vertically from the inner edge of each truncated cone (16), that is to say in this case from the lower end side (18) thereof, and a plurality of tab receiving elements (46) in the inner edge of each truncated cone (16), each tab receiving element (46) being shaped for interconnection with a tab (44) of another truncated cone (16). More specifically, each of the tabs (44) has an end (48) in the form of a hook and each of the tab receiving elements (46) is in the form of a vertical groove into which a tab (44) of another truncated cone (16) is slidably insertable.

As best shown in FIG. 1, the filter housing (6) is preferably tubular and comprises an open top (50) and a cover (52) adapted to hermetically fit on the open top (50) of the filter housing (6). A hanger (54) is mounted in the cover (52) for suspending the filter unit (4) in the filter housing (6). The hanger (54) preferably has a lower portion (56) for extending downwardly in the filter housing (6) and brackets (58) at the lower portion (56) connectable to an uppermost truncated cone (17) of the filter unit (4).

Also preferably, the filter housing (6) comprises a conical bottom wall (60) with a central opening consisting of the inlet (8) of the filter housing (6). The filter unit (4) is thus mounted vertically in the filter housing (6) by simply introducing the same in the filter housing (6) via the open top end (50) thereof. The filter unit (4) may then be supported by the conical bottom wall (60) of the filter housing (6).

The cover (52) and the top end (50) of the filter housing (6) are shaped so as to be screwable one to each other.

As can be appreciated, the filter housing (6) may advantageously comprise a closable extra outlet (62) in the top portion (14) thereof. This extra outlet (62) can be used for linking a prefilter (2) with another like prefilter.

Considering now the ascending slope of the passages (22) between the lamellar structures (16), the decantation phenomenon of the particles, which is the principle of lamellar decantation, and the biological coalescence of fine particles, which is the result of agglutination by the micro-organisms of fine particles into matter that can be decanted, can therefore take place. The spacing between the top edge (29) of the dam wall (28) and the following conical element (16) creates the linear interstice (42) whose thickness is sized as a function of the size of the particles to retain. With time, the decanted matters accumulate and a biological film develops at the level of the interstice (42) and on the inclined walls of the cone (16). When the quantity of accumulated matters reaches a certain thickness, there may be detachment of those matters, because of the ascending slope of the structure. These matters can then go back into the septic tank by the entrance structure. Furthermore, it is possible that certain fine particles may be released before the detachment of the film, but they cannot reach the effluent of the tank, because they would have to go through the interstices sized in function of the size of the particles to retain and placed on the downstream side of the wall (28). The flow and the retention of the particles are therefore managed by a downstream type control.

As can be appreciated, in the embodiment illustrated in FIGS. 1 and 3, the water flows vertically in the reception chamber (30) located in the open central part of the filter unit (4) and formed by the superposition of the conical lamellar structures (16). The water then flows in the discharge chamber (32) located all around the filter unit (4). Then, it is evacuated through the outlet (12) of the housing (6) located in the top portion (14) thereof and directed towards the outlet orifice of the septic tank (not illustrated) via an outlet pipe (64).

Description of the Second and Third Preferred Embodiments

The more detailed description of the second and third embodiments will now be made by referring to FIGS. 4 to 9.

As can be appreciated in FIGS. 5 and 6, and contrary to the first preferred embodiment, the conical lamellar structures (16) forming the filter unit (4) of the second and third preferred embodiments are disposed such that their outer peripheral edge corresponds to the lower end side (18) of the lamellar structure (16) and that the inner edge corresponds to the upper end side (20), whereby the reception chamber (30) of the prefilter (2) is located all around the filter unit (4) and the discharge chamber (32) is located in a central zone of the filter unit (4).

Figure 4:
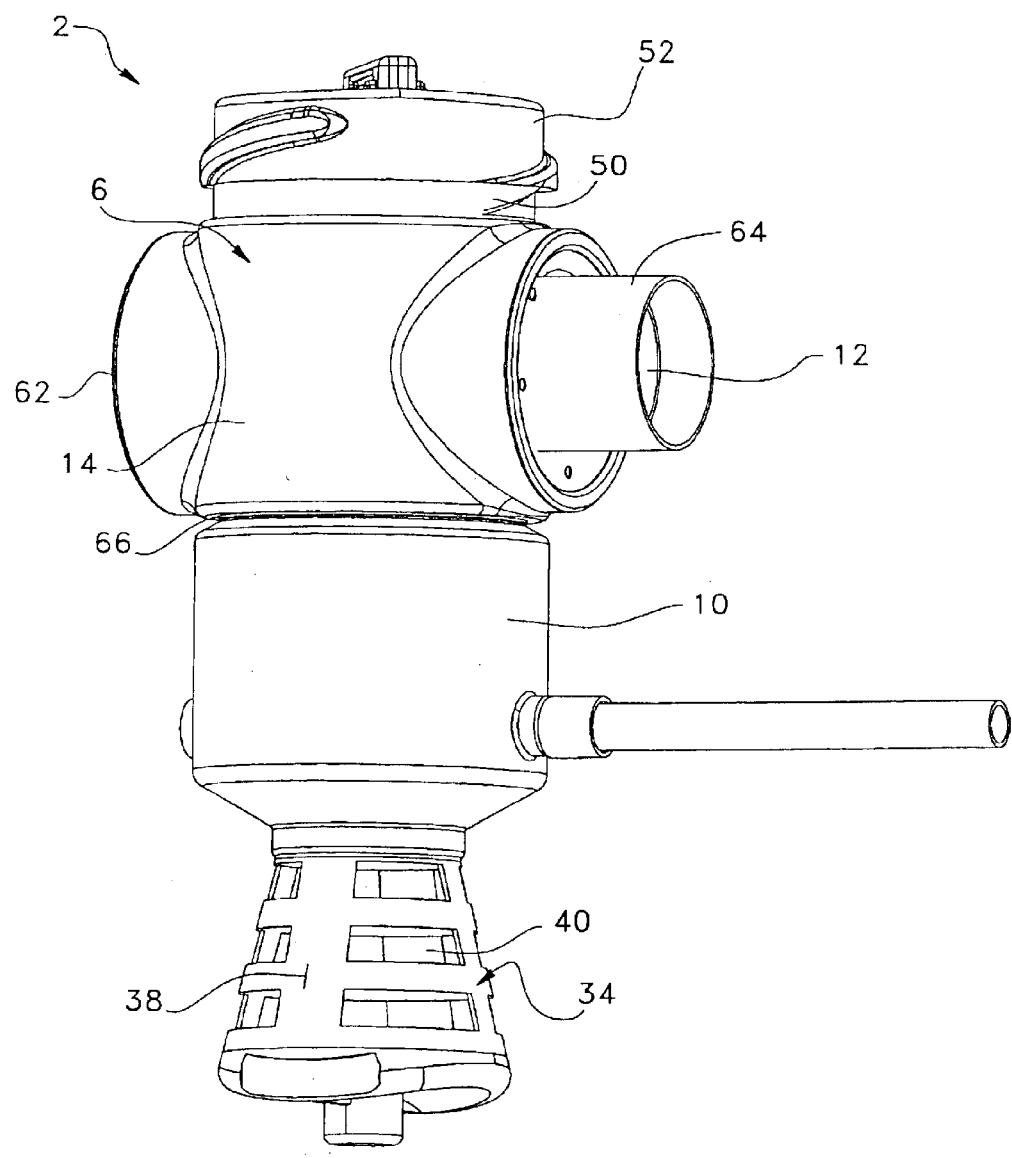
FIG. 4 is a perspective view of a housing used in a second and third preferred embodiment of the invention.

As shown in FIG. 4, the filter housing (6) for both embodiments comprises an annular restriction (66) separating the bottom and top portions (10,14). Turning now to FIG. 5, the filter unit (4) of the second preferred embodiment is located in the bottom portion (10) of the filter housing (6) and the discharge chamber (32) is in fluid communication with the outlet (12) of the filter housing (6) via an outlet chamber (68) located in the top portion (14) of the filter housing (6). The prefilter (2) further comprises an annular watertight liner (70) mounted on an inside rim (72) formed by the restriction (66). The liner (70) is used to hermetically seal the joint between the outlet chamber (68) and the reception chamber (30) of the filter housing (6).

Figure 7:
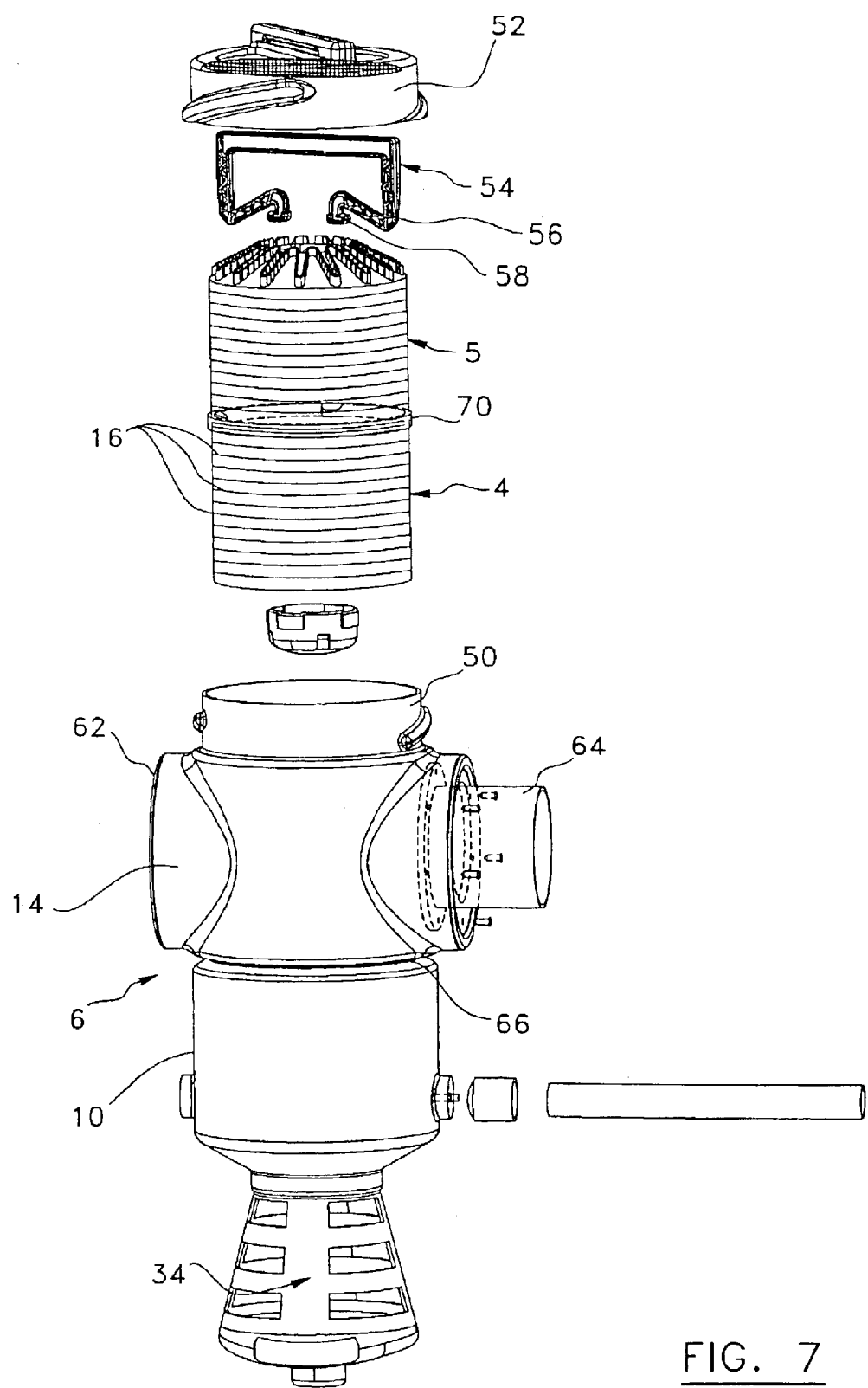
FIG. 7 is an exploded view of the prefilter of FIG. 6.

Referring now to FIGS. 6 and 7, the third preferred embodiment comprises an upper filter unit (5) located in the top portion (14) of the housing (6) on top of the filter unit (4) previously described and hereinafter referred to as the lower filter unit (4). The upper filter unit (5) is used for further filtering liquid previously filtered in the lower filter unit (4). The upper filter unit (5) comprises superposed and spaced-apart truncated hollow cones (16) similar in shape and size with the truncated cones (16) of the lower filter unit (4) and being in registry with the same. The upper filter unit (5) has a lowermost truncated cone superposed on an uppermost truncated cone of the lower filter unit (4). The upper filter unit (5) has a centrally located zone (82) on top of the centrally located zone of the lower filter unit (4).

As for the lower filter unit (4), a passage (22) for a flow of liquid is formed between each two of the spaced-apart truncated cones (16) of the upper filter unit (5). Each of the passages (22) has an inlet (24) at the upper end side (20) of the conical lamellar structure (16) for receiving an inflow of liquid to be filtered and an outlet (26) at the lower end side (18) thereof for discharging an outflow of filtered liquid, whereby the water flowing in the upper filter unit (5) follows a descending path. Also, a filtering means is provided in each of the passages (22) for obstructing the flow of liquid and retaining particulate matter contained in the liquid. Preferably, the filtering means in each passage is an overflow dam wall as described above.

It has to be noted that in another preferred embodiment, not illustrated, the hollow truncated cone of the upper filter unit may be set with the inner edge of the cone as the lower end side of the control lamellar structure. Each of the passages would then have its inlet at the lower end side of the lamellar structure, whereby the water flowing in the upper filter unit would follow an ascending path.

The prefilter (2) according to the third preferred embodiment further comprises a reception chamber (84) for the upper filter unit (5) located in the centrally located zone (82) thereof. The reception chamber (84) of the upper filter unit (5) is in fluid communication with the discharge chamber (32) of the lower filter unit (4) and with the inlet (24) of each of the passages (22) of the upper filter unit (5).

A discharge chamber (86) is also provided for the upper filter unit (5). It is located in the top portion (14) of the filter housing (6) all around the upper filter unit (5) and it is in fluid communication with the outlet (26) of each of the passages (22) between the spaced-apart truncated cones (16) and with the outlet (12) of the housing (6). An annular watertight liner (70) is provided on the inside rim (72) of the housing (6) formed by the restriction (66) for hermetically separating the reception chamber (30) of the lower filter unit (4) and the discharge chamber (86) of the upper filter unit (5).

Figure 9:
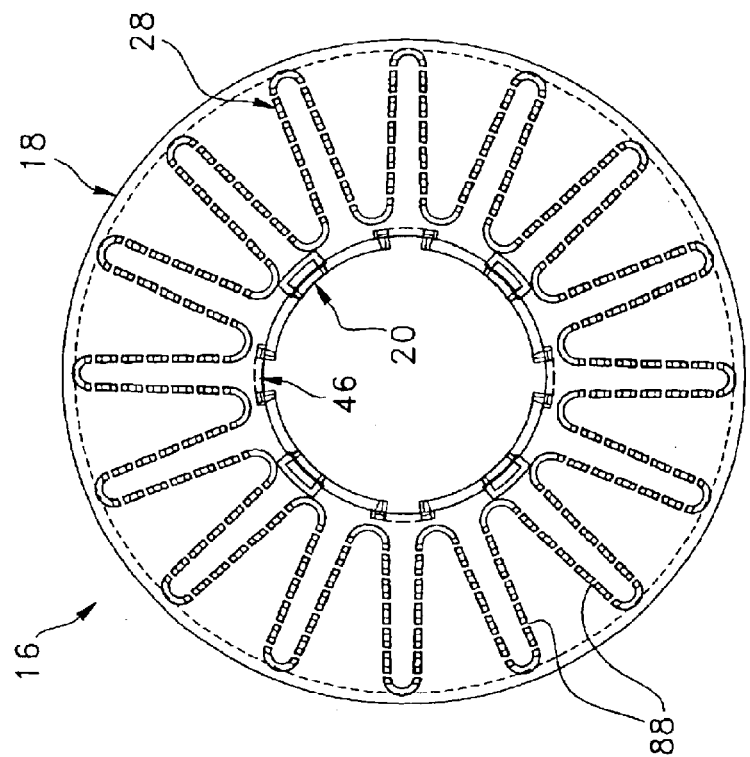
FIG. 9 is a top view of the lamellar structure of FIG. 7.

Referring now to FIGS. 8 and 9, a preferred version of a hollow truncated cone (16) that can be used with the second and third preferred embodiments is illustrated. As for the embodiment shown in FIG. 3 already describes, it comprises an overflow dam wall (28) extending upright from an upper surface thereof. As can be appreciated, in order to further increase the filtering capacity of such dam wall (28), the top edge (29) of the dam wall (28) has a corrugated relief and a plurality of vertical slots (88) are provided along the wall (28).

The remaining characteristics of the second and third preferred embodiments are substantially identical to the characteristics already described in reference to the first embodiment.

Advantageously, the inclined configuration of the lamellar structure allows to increase the length of the linear filtration interstice formed with the dam wall and thus greatly increases the filtration capacity of the filter unit in comparison to a flat structure, such as it is described in the American U.S. Pat. Nos. 2,900,084; 3,332,552; 4,710,295; 5,582,716 and 5,593,584. Also, the addition of vertical slits, perpendicular to the plane of the conical elements, allows to increase the total interstitial surface available for filtration. As an example, a prefilter according to the invention, of the hollow conical truncated type, as illustrated in FIG. 3, with a circular section of 20 cm in diameter, presents an interstitial surface comparable to what is observed with prefilters of horizontal planar structures of 30 cm presently on the market (1080 cm$^2$ for the 20 cm truncated cone type vs 958 cm$^2$ for the 30 cm). Whereas, a prefilter according to the present invention, as illustrated in FIG. 5, with a circular section of 18.75 cm in diameter, presents an interstitial surface comparable to that observed with prefilters with planar horizontal structures of 30 cm currently on the market (645 cm$^2$ of useful surface for the 18.75 cm truncated type cone vs 700 cm$^2$ for the 30 cm).

It is also worth noting that the detachment of the particles and the biological film accumulated allows to reduce the number of cleanings and facilitates them. In fact, the detachment of the accumulated material is accentuated by the natural wiping and dripping phenomenon resulting from the removal of the filtering structure from the water.

The inclined configuration of the lamellar structure also eases the cleaning operation of the filter unit with a jet of water.

The inclination of each element can either be towards the interior or towards the exterior, depending on the chosen direction of the flow (from the centre to the perimeter or from the perimeter to the centre).

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A prefilter comprising:
   a filter housing having an inlet in a bottom portion thereof for receiving an inflow of liquid to be filtered and an outlet in a top portion thereof for discharging an outflow of filtered liquid;
   a lower filter unit located in the bottom portion of the housing, comprising:
      superposed and spaced-apart inclined lamellar structures having the shape of hollow truncated structures each having a lower end side opposite an upper end side;
      a passage for a flow of liquid between each two of said lamellar structures, each passage having an inlet for receiving an inflow of liquid to be filtered and an outlet for discharging an outflow of filtered liquid;
      filtering means in each of said passages for obstructing the flow of liquid and retaining particulate matter contained in the liquid; and
      a discharge chamber in fluid communication with the outlets of the lower filter unit, the discharge chamber being located in a centrally located zone of the lower filter unit;
   a reception chamber in the filter housing in fluid communication with the inlet of the housing and with the inlets of the lower filter unit, the liquid to be filtered entering the housing via the inlet thereof and flowing across the reception chamber to enter the inlets of the lower filter unit; and the filtered liquid discharged at the outlets of the lower filter unit flowing across the discharge chamber towards the outlet of the filter housing;
   an upper filter unit located in the top portion of the housing on top of the lower filter unit for further filtering liquid previously filtered in the lower filter unit, the upper filter unit comprising:
      superposed and spaced-apart truncated hollow structures similar in shape and size with the truncated structures of the lower filter unit and being in registry with the same, the upper filter unit having a lowermost truncated structure superposed on an uppermost truncated structure of the lower filter unit, the hollow truncated structures of the upper filter unit having an upper end side and a lower end side, and a centrally located zone on top of the centrally located zone of the lower filter unit;
      a passage for a flow of liquid between each two of said spaced-apart truncated structures having an inlet for receiving an inflow of liquid to be filtered and an outlet for discharging an outflow of filtered liquid; and
      filtering means in each of said passages for obstructing the flow of liquid and retaining particulate matter contained in the liquid;
      a reception chamber located in the centrally located zone thereof, the reception chamber being in fluid communication with the discharge chamber of the lower filter unit and with the inlet of each of the passages of the upper filter unit;
   a discharge chamber for the upper filter unit located in the top portion of the filter housing around said upper filter unit, the discharge chamber being in fluid communication with the outlet of each of the passages of the upper filter unit and with the outlet of the housing;
   wherein the reception chamber of the lower filter unit is hermetically separated from the discharge chamber of the upper filter unit; and
   wherein the filter units are vertically mounted in the filter housing.

2. A prefilter as claimed in claim 1, wherein the inlet of each of said passages of the lower filter unit is located on the lower end side of the respective lamellar structures and the outlet is located on the upper end side of the respective lamellar structures, whereby the flow of liquid in the passages is ascendant in the lower filter unit.

3. A prefilter as claimed in claim 2, wherein each of said lamellar structures in the form of hollow truncated structures has an outer peripheral edge and an inner edge smaller than the outer peripheral edge, the outer peripheral edge being the lower end side of the lamellar structure and the inner edge being the upper end side of the lamellar structure, whereby the liquid enters the passage between two truncated structures in the lower filter unit from the outer peripheral edge thereof and flows upwardly towards the inner edge thereof.

4. A prefilter as claimed in claim 3, comprising linking means for linking the lamellar structures one to another in superposition.

5. A prefilter as claimed in claim 4, wherein the linking means comprises:
 a plurality of tabs extending vertically from the inner edge of each truncated structure; and
 a plurality of tab receiving elements in the inner edge of the truncated structure, each tab receiving element being shaped for interconnection with a tab of another truncated structure.

6. A prefilter as claimed in claim 5, wherein each of said tabs has an end in the form of a hook and each of said tab receiving elements is in the form of a vertical groove into which a tab of another truncated structure is slidably insertable.

7. A prefilter as claimed in claim 2, wherein each of said two lamellar structures includes an upper lamellar structure and a lower lamellar structure, and the filtering means in each of said passages comprises:
 an overflow dam wall extending upright from said lower lamellar structure and having a top edge spaced apart from an underside surface of the upper lamellar structure; and
 a linear interstice between the top edge of the dam wall and the underside surface of the upper lamellar structure.

8. A prefilter as claimed in claim 7, wherein the overflow dam wall in each of said passages follows a sinuous path.

9. A prefilter as claimed in claim 8, wherein the continuous dam wall in each of said passages has a top edge with a corrugated relief.

10. A prefilter as claimed in claim 7, wherein the overflow dam wall in each of said passages comprises a plurality of vertical slots to further filter the liquid.

11. A prefilter as claimed in claim 1, wherein said hollow truncated structures are hollow truncated cones.

12. A prefilter as claimed in claim 1, wherein the filter housing has a top end and a bottom end, the inlet of the filter housing being an opening in the bottom end thereof, and the combination further comprises:
 an inlet chamber extending at said bottom end of the filter housing, the inlet chamber being in fluid communication with the reception chamber of the filter housing via an outlet of the inlet chamber hermetically connected to the inlet of the filter housing, the inlet chamber having a sidewall provided with a plurality of slots sized and shaped for receiving and prefiltering liquid to be filtered, whereby the liquid to be filtered enters the inlet chamber via the slots thereof and then flows across the inlet chamber and upwardly in the reception chamber of the filter housing.

13. A prefilter as claimed in claim 1, comprising a cover adapted to hermetically fit on the top end of the filter housing.

14. A prefilter as claimed in claim 13, wherein the filter units are vertically mounted in the filter housing by a mechanism which comprises a hanger mounted in the cover, the hanger having a lower portion for extending downwardly in the filter housing and brackets at said lower portion connectable to an uppermost truncated cone for suspending the upper and lower filter units in the filter housing.

15. A prefilter as claimed in claim 14, wherein the reception chamber of the lower filter unit is hermetically separated from the discharge chamber of the upper filter unit by a mechanism which comprises:
 a restriction in the side wall of the filter housing separating the bottom portion and the top portion thereof; and
 a watertight liner mounted at said restriction.

* * * * *